(12) United States Patent
Huang et al.

(10) Patent No.: US 12,722,303 B2
(45) Date of Patent: Sep. 1, 2026

(54) HAND-EYE CALIBRATION METHOD AND HAND-EYE CALIBRATION DEVICE FOR ROBOT ARM

(71) Applicant: PEGATRON CORPORATION, Taipei City (TW)

(72) Inventors: Ke-Jung Huang, Taipei City (TW); Chao-Chien Lee, Taipei City (TW); Jen-Hui Wang, Taipei City (TW); Chun-Hsi Wu, Taipei City (TW)

(73) Assignee: PEGATRON CORPORATION, Taipei City (TW)

( * ) Notice: Subject to any disclaimer, the term of this patent is extended or adjusted under 35 U.S.C. 154(b) by 288 days.

(21) Appl. No.: 18/315,315

(22) Filed: May 10, 2023

(65) Prior Publication Data

US 2024/0009849 A1 Jan. 11, 2024

(30) Foreign Application Priority Data

Jul. 7, 2022 (TW) ................................. 111125514

(51) Int. Cl.
*B25J 9/00* (2006.01)
*B25J 9/16* (2006.01)
*B25J 13/02* (2006.01)
*G06T 7/70* (2017.01)

(52) U.S. Cl.
CPC ........... *B25J 9/1692* (2013.01); *B25J 9/1697* (2013.01); *B25J 13/02* (2013.01); *G06T 7/70* (2017.01)

(58) Field of Classification Search
CPC ........ B25J 9/1692; B25J 9/1697; B25J 13/02; G06T 7/70
See application file for complete search history.

(56) References Cited

U.S. PATENT DOCUMENTS

| | | | | |
|---|---|---|---|---|
| 10,076,842 | B2 * | 9/2018 | Liu | G06T 7/80 |
| 11,059,169 | B2 * | 7/2021 | Suzuki | B25J 9/1692 |
| 2005/0256395 | A1 * | 11/2005 | Anabuki | G06T 7/246 600/414 |
| 2013/0010081 | A1 * | 1/2013 | Tenney | H04N 13/20 348/47 |

(Continued)

FOREIGN PATENT DOCUMENTS

| | | |
|---|---|---|
| CN | 103209809 | 2/2017 |
| CN | 109159114 | 3/2021 |

*Primary Examiner* — Truc M Do
(74) *Attorney, Agent, or Firm* — J.C. PATENTS

(57) ABSTRACT

A hand-eye calibration method and a hand-eye calibration device for a robot arm are provided. The method includes following steps. A first mapping relationship between a base of the robot arm and a terminal of the robot arm and a second mapping relationship between a camera and a target object are obtained. Based on a scale, a third mapping relationship between the terminal of the robot arm and a tool set mounted on the terminal and a fourth mapping relationship between the camera and the base in each dimension are updated to minimize an error between a position of the target object in an image captured by the camera and a position of the tool set. In response to the error being convergent and the scale being less than or equal to a scale threshold, the third mapping relationship and the fourth mapping relationship calibrated by the scale are output.

14 Claims, 4 Drawing Sheets

(56) References Cited

U.S. PATENT DOCUMENTS

| | | | | |
|---|---|---|---|---|
| 2014/0229005 | A1* | 8/2014 | Suzuki | B25J 9/1692<br>700/254 |
| 2015/0025683 | A1* | 1/2015 | Amano | B25J 9/1692<br>700/254 |
| 2016/0059419 | A1* | 3/2016 | Suzuki | B25J 9/1692<br>901/14 |
| 2018/0126553 | A1* | 5/2018 | Corkum | B25J 9/1697 |

* cited by examiner

HAND-EYE CALIBRATION METHOD AND HAND-EYE CALIBRATION DEVICE FOR ROBOT ARM

CROSS-REFERENCE TO RELATED APPLICATION

This application claims the priority benefit of Taiwan patent application no. 111125514, filed on Jul. 7, 2022. The entirety of the above-mentioned patent application is hereby incorporated by reference herein and made a part of this specification.

BACKGROUND

Technical Field

The disclosure relates to a hand-eye calibration method and a hand-eye calibration device for a robot arm; more particularly, the disclosure relates to a hand-eye calibration method and a hand-eye calibration device adapted to a robot arm based on eye-to-hand.

Description of Related Art

A robot arm system based on eye-to-hand may obtain an image of a monitored region by installing a camera at a fixed position and then control the robot arm according to the image to process a target object in the monitored region. In order to make the operation of the robot arm more accurate, a user may perform a hand-eye calibration process on the robot arm system to ensure a coordinate transformation relationship among the robot arm, the camera, and the target object to be accurate. However, the hand-eye calibration is a calibration method which requires human intervention. If the user does not have the professional background in operating the robot arm, or the user fails to spend a significant amount of time on performing the hand-eye calibration process, results of the hand-eye calibration are often unsatisfactory. Accordingly, how to provide an accurate hand-eye calibration method is one of the goals that people in the field are committed to.

SUMMARY

The disclosure provides a hand-eye calibration method and a hand-eye calibration device, whereby a coordinate transformation relationship among an eye-to-hand robot arm, a camera, and a target object may be automatically calibrated.

In an embodiment of the disclosure, a hand-eye calibration method adapted to a robot arm is provided, and the hand-eye calibration method includes following steps. A first mapping relationship between a base of the robot arm and a terminal of the robot arm and a second mapping relationship between a camera and a target object are obtained. A third mapping relationship between the terminal of the robot arm and a tool set mounted on the terminal and a fourth mapping relationship between the camera and the base are sequentially updated in each dimension based on a scale, so as to minimize an error between a position of the target object in an image captured by the camera and a position of the tool set. In response to the error being convergent and the scale less than or equal to a scale threshold, the third mapping relationship and the fourth mapping relationship calibrated by the scale are output.

In an embodiment of the disclosure, a hand-eye calibration device adapted to a robot arm is provided, and the hand-eye calibration device includes a transceiver and a processor. The processor is coupled to the transceiver and configured to obtain a first mapping relationship between a base of the robot arm and a terminal of the robot arm and a second mapping relationship between a camera and a target object through the transceiver, sequentially update a third mapping relationship between the terminal of the robot arm and a tool set mounted on the terminal and a fourth mapping relationship between the camera and the base in each dimension based on a scale, so as to minimize an error between a position of the target object in an image captured by the camera and a position of the tool set, and output the third mapping relationship and the fourth mapping relationship calibrated by the scale through the transceiver in response to the error being convergent and the scale less than or equal to a scale threshold.

Based on the above, as to the coordinate transformation relationship among each element in the robot arm system, the hand-eye calibration device provided in one or more embodiments of this disclosure may calibrate a transformation matrix which may have errors in the coordinate transformation relationship by applying a specific scale. In the calibration process, the hand-eye calibration device may continuously reduce the scale to gradually minimize the error of the transformation matrix, so that the calibration result of the transformation matrix becomes more accurate. In addition, during the calibration process, the calibration is sequentially performed in each dimension, i.e., through convergence along one axis, so as to significantly reduce computational complexity.

To make the above more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate embodiments of the disclosure and, together with the description, serve to explain the principles of the disclosure.

DESCRIPTION OF THE EMBODIMENTS

Figure 1:
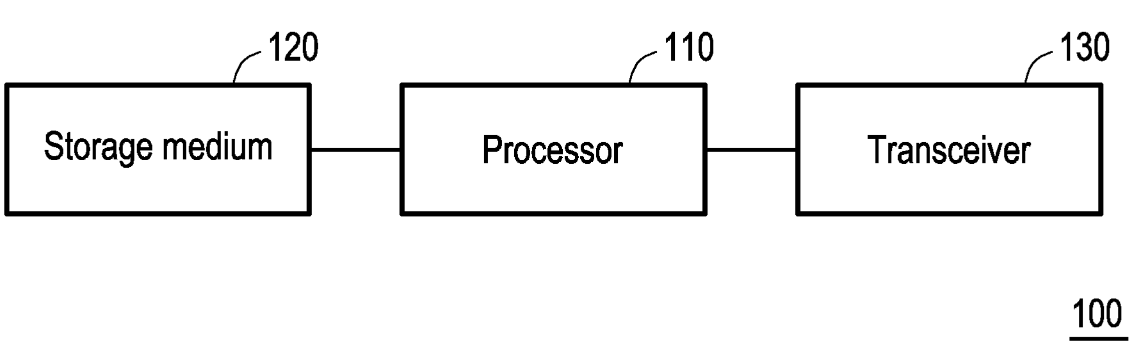
FIG. 1 is a schematic view illustrating a hand-eye calibration device according to an embodiment of the disclosure.

The embodiments of the disclosure are provided below for the purpose of clarity, and details for implementation are incorporated below. Moreover, wherever possible, elements/components/steps with the same reference numbers in the drawings and the embodiments denote the same or similar parts.

FIG. 1 is a schematic view illustrating a hand-eye calibration device 100 according to an embodiment of the disclosure. Here, the hand-eye calibration device 100 is adapted to calibrate a robot arm based on eye-to-hand. The hand-eye calibration device 100 may include a processor 110, a storage medium 120 and a transceiver 130.

The processor 110 is, for instance, a central processing unit (CPU), another programmable general-purpose or special-purpose micro control unit (MCU), microprocessor, digital signal processor (DSP), programmable controller, application specific integrated circuit (ASIC), graphics processing unit (GPU), image signal processor (ISP), image processing unit (IPU), arithmetic logic unit (ALU), complex programmable logic device (CPLD), field programmable gate array (FPGA), any other similar element, or a combination of the above elements. The processor 110 may be coupled to the storage medium 120 and the transceiver 130 and may access and execute a plurality of modules and various applications stored in the storage medium 120.

The storage medium 120 is, for instance, any type of fixed or movable random access memory (RAM), read only memory (ROM), flash memory, hard disk drive (HDD), solid state drive (SSD), any other similar element, or a combination of the above elements, and the storage medium 120 is configured to store the modules or various applications which may be executed by the processor 110.

The transceiver 130 transmits and receives signals in a wireless manner or through a cable. The transceiver 130 may further perform other operations, such as low-noise amplification, impedance matching, frequency mixing, upward or downward frequency conversion, filtering, amplification, and other similar operations.

Figure 2:
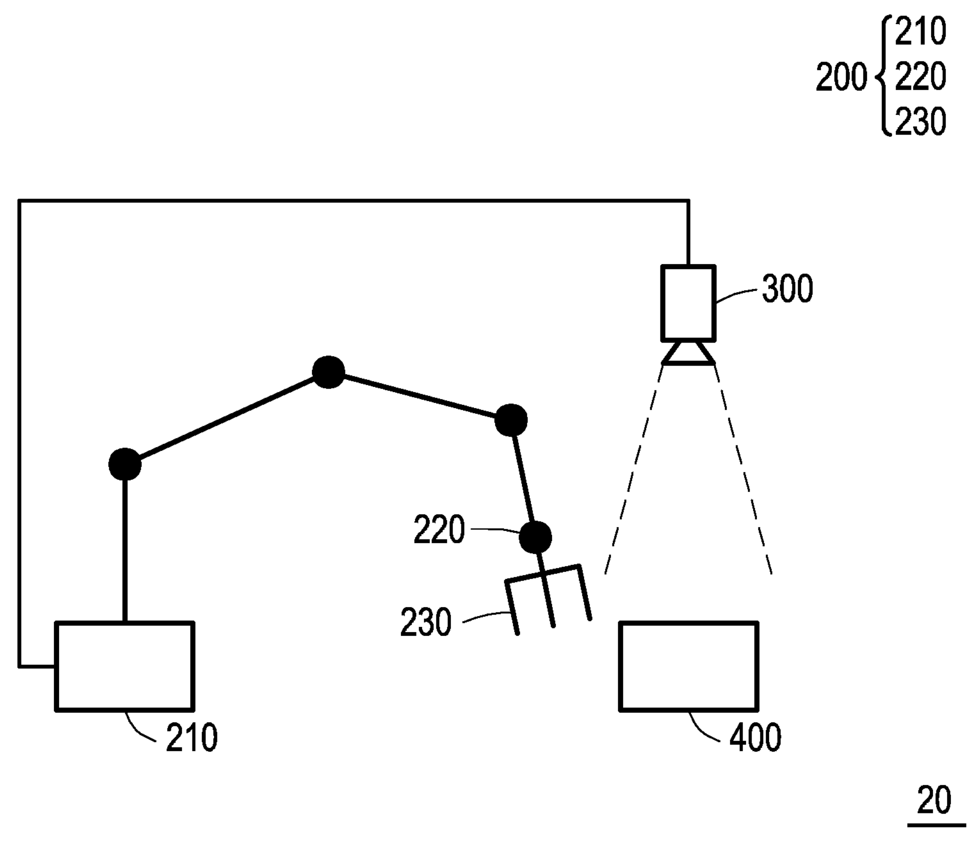
FIG. 2 is a schematic view illustrating an eye-to-hand robot arm system according to an embodiment of the disclosure.

FIG. 2 is a schematic view illustrating a robot arm system 20 based on eye-to-hand according to an embodiment of the disclosure. The robot arm system 20 may include a robot arm 200, a camera 300, and a target object 400 to be processed by the robot arm 200. The camera 300 may be installed at a fixed position and is able to capture a fixed monitored region. The target object 400 may be placed in the monitored region.

The robot arm 200 may include a base 210, a terminal 220, and a tool set 230. The base 210 is configured to dispose the robot arm 200 at a fixed position. The robot arm 200 may include a plurality of joint nodes, where the terminal 220 is, among the joint nodes, the node located at the end of the robot arm 200. The terminal 220 may have a flange for connecting the tool set 230. In response to different tasks, the tool set 230 may have different configurations. For instance, when the task of the robot arm 200 is to move the target object 400 composed of metal, the tool set 230 may be an iron plate with a magnetic force. When the task of the robot arm 200 is to process the target object 400, the tool set 230 may be a gripper jaw.

The robot arm 200 may be connected to the camera 300. After the camera 300 obtains an image of the monitored region, a controller of the robot arm 200 may obtain the image from the camera 300 and control the robot arm 200 to act on the target object 400 according to the image.

In a three-dimensional space, the position and the posture of an object may be represented by six parameters [x y z rx ry rz], where x represents a coordinate value of the object on an x-axis of a Cartesian coordinate system, y represents a coordinate value of the object on a y-axis of the Cartesian coordinate system, z represents a coordinate value of the object on a z-axis of the Cartesian coordinate system, rx represents an angle of rotation by which the object rotates around the x-axis (or an Eulerian angle corresponding to the x-axis), ry represents an angle of rotation by which the object rotates around the y-axis (or an Eulerian angle corresponding to the y-axis), and rz represents an angle of rotation by which the object rotates around the z-axis (or an Eulerian angle corresponding to the z-axis). The parameters [x y z] may serve to represent the position of the object, and the parameters [rx ry rz] may serve to represent the posture of the object. A mapping relationship between a coordinate system of the origin in the three-dimensional space and a coordinate system of the object may be represented by a transformation matrix shown as (1) below.

$$\begin{bmatrix} \cos ry\cos rz & \sin rx\ \sin ry\ \cos rz - \cos rx\ \sin rz & \cos rx\sin ry\cos rz + \sin rx\sin rz & x \\ \cos ry\sin rz & \sin rx\ \sin ry\ \sin rz + \cos rx\ \cos rz & \cos rx\sin ry\sin rz - \sin rx\cos rz & y \\ -\sin ry & \sin rx\cos ry & \cos rx\cos ry & z \\ 0 & 0 & 0 & 1 \end{bmatrix} \tag{1}$$

In the three-dimensional space, when the tool set 230 of the robot arm 200 is attached to the target object 400, the ideal coordinate transformation relationship among each element in the robot arm system 20 is shown in equation (2), where a transformation matrix A corresponds to a mapping relationship between a coordinate system of the base 210 and a coordinate system of the terminal 220, a transformation matrix B corresponds to a mapping relationship between the coordinate system of the terminal 220 and a coordinate system of the tool set 230, a transformation matrix C corresponds to a mapping relationship between the coordinate system of the base 210 and a coordinate system of the camera 300, and a transformation matrix D corresponds to a mapping relationship between the coordinate system of the camera 300 and the coordinate system of the target object 400. In this embodiment, the mapping relationship includes a coordinate transformation relationship between two coordinate systems.

$$A \cdot B = C \cdot D \quad B = \begin{bmatrix} & x_b \\ R_b & y_b \\ & z_b \\ 0 & 1 \end{bmatrix} \tag{2}$$

$$A_1 \times B = \begin{bmatrix} & x \\ R_1 & y \\ & z \\ 0 & 1 \end{bmatrix}, A_2 \times B = \begin{bmatrix} & x \\ R_2 & y \\ & z \\ 0 & 1 \end{bmatrix}, \ldots , A_N \times B = \begin{bmatrix} & x \\ R_n & y \\ & z \\ 0 & 1 \end{bmatrix} \tag{3}$$

In the conventional calibration process, the transformation matrix B of the tool set 230 is obtained through multi-point calibration by defining a tool set angle Rb by the user and manually moving the robot arm 200, so that the tool set 230 at different postures touches an element at a fixed position in the space (as shown in formula (3), N transformation matrices such as A1, A2, . . . , and AN may be obtained from the posture and the position of the terminal 220 of the robot arm 200 in the known space; the N transformation matrices have the same coordinate values x, y, and z and may serve to calculate coordinate values xb, yb, and zb of the transformation matrix B of the tool set 230, and N may be set to 4). The mapping relationship (i.e., the transformation matrix D) between the target object 400 and the camera 300 is obtained by placing a template of a known dimension and obtaining an image captured by the camera 300 to learn a corresponding relationship. After the tool set 230 is attached to the target object 400, the actual coordinate value of each element in the robot arm system 20 may be substituted into the transformation matrix A, the transformation matrix B, and the transformation matrix D of the equation (2). In the case where the transformation matrix A, the transformation matrix B, and the transformation matrix D are known, the transformation matrix C may be derived based on the equation (2). However, since the calibration of the transformation matrix B is performed by an operator operating the robot arm 200 at a posture to touch a fixed point, the accuracy of the transformation matrix B is affected by the quality of the operator's operation (whether the operated robot arm 200 touches the same location). In addition, since the transformation matrix C is further derived from the transformation matrix B, errors often exist between the transformation matrix B and the transformation matrix C. Therefore, the transformation matrix B and the transformation matrix C should be calibrated at the same time, so that the coordinate transformation relationship among the elements of the robot arm system 20 is consistent with the equation (2). In order to solve said issues, the hand-eye calibration device 100 is provided in the disclosure. The hand-eye calibration device 100 is able to calibrate the transformation matrix B and the transformation matrix C of the robot arm system 20 synchronously.

Each transformation matrix in the equation (2) may be associated with 6 coordinate values. Take the transformation matrix B as an example, the numeral value of the transformation matrix B may be determined by the following 6 coordinate values: a relative offset coordinate value x of the terminal 220 and the tool set 230, a relative offset coordinate value y of the terminal 220 and the tool set 230, a relative offset coordinate value z of the terminal 220 and the tool set 230, a relative angle coordinate value rx of the terminal 220 and the tool set 230, a relative angle coordinate value ry of the terminal 220 and the tool set 230, and a relative angle coordinate value rz of the terminal 220 and the tool set 230. In the exemplary transformation matrix C, the numeral value of the transformation matrix C may be determined by the following 6 coordinate values: relative offset coordinate values x, y, and z of the camera 300 and the base 210 and relative angle coordinate values rx, ry, and rz of the camera 300 and the base 210.

Figure 3:
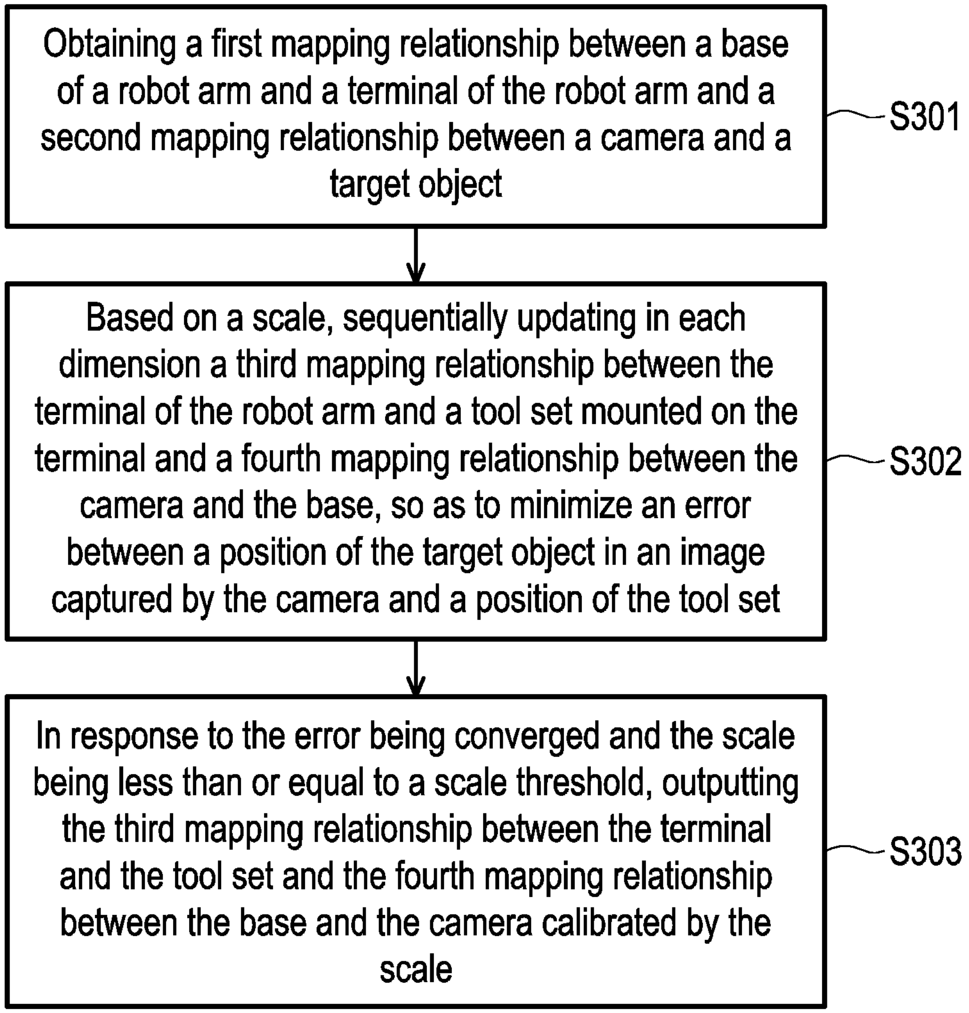
FIG. 3 is a flowchart illustrating a hand-eye calibration method according to an embodiment of the disclosure.
Figure 4:
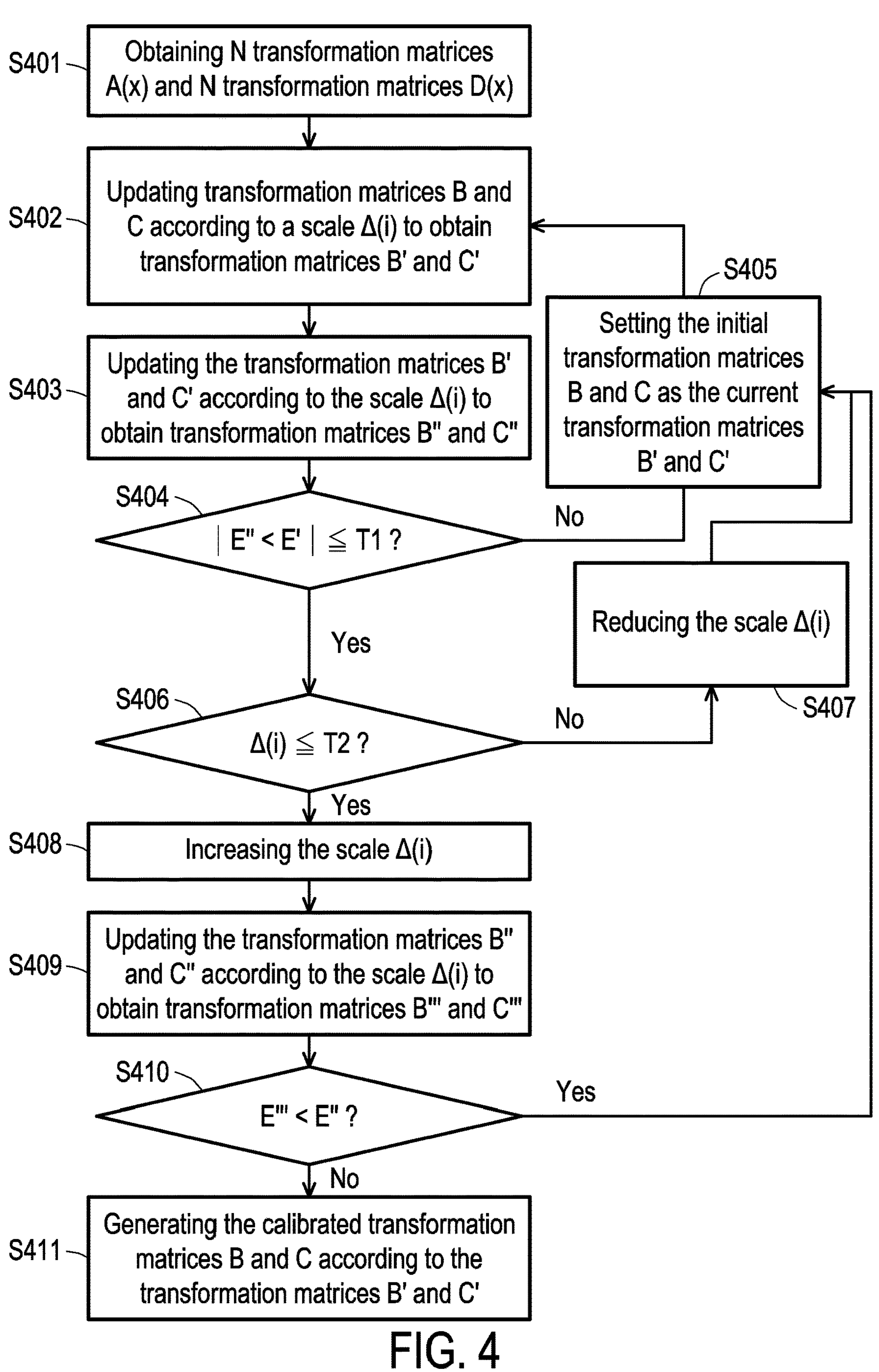
FIG. 4 is a flowchart illustrating a hand-eye calibration method in a more detailed manner according to an embodiment of the disclosure.

FIG. 3 is a flowchart illustrating a hand-eye calibration method according to an embodiment of the disclosure, where the hand-eye calibration method may be implemented by applying the hand-eye calibration device 100 shown in FIG. 1. In this embodiment, it is assumed that the robot arm system 20 is in a state to be calibrated. In step S301, the hand-eye calibration device 100 obtains the first mapping relationship between the base of the robot arm and the terminal of the robot arm and the second mapping relationship between the camera and the target object. Specifically, please refer to FIG. 4. FIG. 4 is a flowchart illustrating a hand-eye calibration method in a more detailed manner according to an embodiment of the disclosure. In step S401, the processor 110 may obtain N transformation matrices A(x) from the robot arm system 20 through the transceiver 130 and may obtain N transformation matrices D(x) from an image captured by the camera 200, where x is an index (x=1-N) of the transformation matrix, and N is a positive integer.

The user may manually move the robot arm 200, so that the tool set 230 is attached to the target object 400. After the attachment is completed, the robot arm system 20 may output a transformation matrix set according to the position of each element. Then, the user may manually move the robot arm 200 again, so that the tool set 230 may be attached to the target object 400 in another way. After the attachment is completed, the robot arm system 20 may output another transformation matrix set according to the position of each element. After performing said step for N times, the robot arm system 20 may output N transformation matrix sets, as shown in Table 1. The processor 110 may obtain the information in Table 1 from the robot arm system 20 through the communication between the transceiver 130 and the robot arm system 20.

TABLE 1

| Index x | Transformation matrix A | Transformation matrix B | Transformation matrix C | Transformation matrix D |
|---|---|---|---|---|
| 1 | $A_1$ | B | C | $D_1$ |
| 2 | $A_2$ | | | $D_2$ |
| . . . | . . . | | | . . . |
| N | $A_N$ | | | $D_N$ |

After obtaining the information in Table 1, the processor 110 may, based on a scale, sequentially in each dimension (i.e., the x-axis, the y-axis, the z-axis, an angle RX of torsion along the x-axis, an angle RY of torsion along the y-axis, and an angle RZ of torsion along the z-axis) update the transformation matrix B and the transformation matrix C, so as to minimize an error (hereinafter referred to as "error e") between a position of the target object 400 in the image captured by the camera 300 and a position of the tool set 230. In detail, the processor 110 sequentially updates the transformation matrix B and the transformation matrix C in each dimension through a convergence computation method along one axis, so as to reduce the computational complexity.

Back to FIG. 3, in step S302, the processor 110 may, based on the scale, sequentially update in each dimension a third mapping relationship between the terminal of the robot arm and the tool set mounted on the terminal and a fourth mapping relationship between the camera and the base, so as to minimize the error between the position of the target object in the image captured by the camera and the position of the tool set. Specifically, with reference to FIG. 4, in step S402, the processor 110 may obtain a transformation matrix B' by updating the transformation matrix B according to the scale Δ(i) and may obtain a transformation matrix C' by updating the transformation matrix C according to the scale Δ(i).

Figure 5:
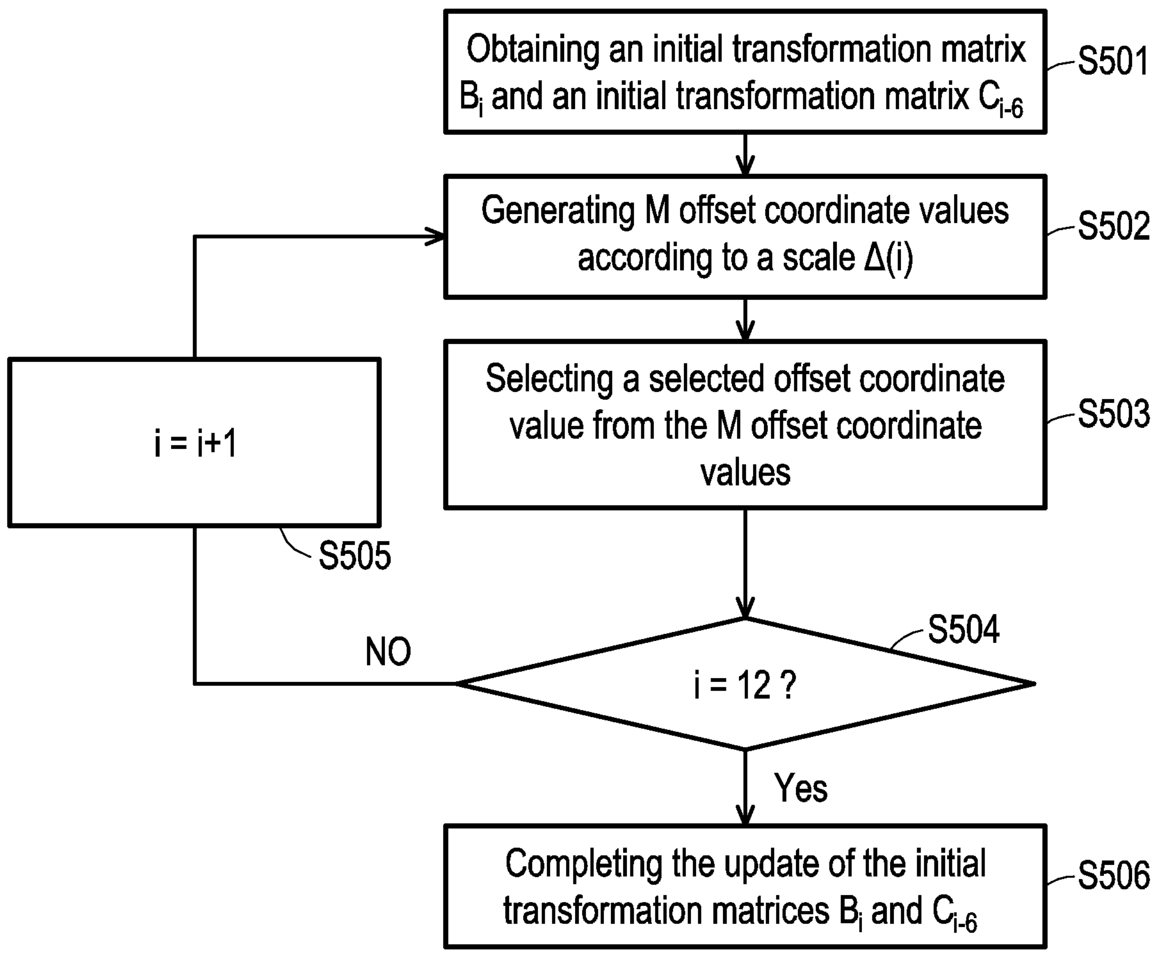
FIG. 5 is a flowchart illustrating a process of updating a transformation matrix according to an embodiment of the disclosure.

FIG. 5 is a flowchart illustrating a process of updating a transformation matrix according to an embodiment of the disclosure, i.e., the details of the step S402, step S403, or step S409. In step S501, the processor 110 may obtain an initial transformation matrix $B_i$ and an initial transformation matrix $C_{i-6}$. If the processor 110 is performing the step S402, the initial transformation matrix $B_i$ and the initial transformation matrix $C_{i-6}$ may be of initial calibration values (e.g., B and C in Table 1). If the processor 110 is performing the step S403, the initial transformation matrix $B_i$ may be the rotation coordinate B' generated in the step S402, and the initial transformation matrix $C_{i-6}$ may be the rotation coordinate C' generated in the step S302. If the processor 110 is performing the step S409, the initial transformation matrix $B_i$ may be a rotation coordinate B" generated in the step S403, and the initial transformation matrix $C_{i-6}$ may be a rotation coordinate C" generated in the step S403. In step S502, the processor 110 may obtain the coordinate value corresponding to the transformation matrix B and the coordinate value corresponding to the transformation matrix C and generate M offset coordinate values according to the current scale and coordinate value, in which M is a positive integer. As shown in equation (4), when i≤6, $P_{BC}$(i, j) may represent the j-th (j=1-M) offset coordinate value of the i-th coordinate value corresponding to the initial transformation matrix $B_i$ (i=1-6, i is the index of the 6 coordinate values associated with the transformation matrix, and the initial value of i may be 1). When i>6, $P_{BC}$(i, j) may represent the j-th (j=1-M) offset coordinate value of the (i-6)th coordinate value corresponding to the initial transformation matrix $C_{i-6}$ (i=7-12, i is the index of the 6 coordinate values associated with the transformation matrix, and the initial value of i may be 7). (i) may represent the current scale, and α(j) may represent the weight corresponding to the j-th offset coordinate value. When i≤6, $P_{BC}$ (i) may represent the i-th coordinate value corresponding to the initial transformation matrix $B_i$. When i>6, (i) may represent the (i-6)th coordinate value corresponding to the initial transformation matrix $C_{i-6}$. For instance, when i=1, $P_{BC}$(i) may represent the relative offset coordinate value x associated with the terminal 220 and the tool set 230 in the initial transformation matrix $B_i$. When i=2, $P_{BC}$(i) may represent the relative offset coordinate value y associated with the terminal 220 and the tool set 230 in the initial transformation matrix $B_i$. When i=3, (i) may represent the relative offset coordinate value z associated with the terminal 220 and the tool set 230 in the initial transformation matrix $B_i$. When i=4, $P_{BC}$ (i) may represent the relative angle coordinate value rx associated with the terminal 220 and the tool set 230 in the initial transformation matrix $B_i$. When i=5, $P_{BC}$ (i) may represent the relative angle coordinate value ry associated with the terminal 220 and the tool set 230 in the initial transformation matrix $B_i$. When i=6, (i) may represent the relative angle coordinate value rz associated with the terminal 220 and the tool set 230 in the initial transformation matrix $B_i$. When i=7, $P_{BC}$ (i) may represent the relative offset coordinate value x associated with the camera 300 and the base 210 in the initial transformation matrix $C_{i-6}$. When i=8, $P_{BC}$(i) may represent the relative offset coordinate value y associated with the camera 300 and the base 210 in the initial transformation matrix $C_{i-6}$. When i=9, $P_{BC}$ (i) may represent the relative offset coordinate value z associated with the camera 300 and the base 210 in the initial transformation matrix $C_{i-6}$. When i=10, $P_{BC}$ (i) may represent the relative angle coordinate value rx associated with the camera 300 and the base 210 in the initial transformation matrix $C_{i-6}$. When i=11, (i) may represent the relative angle coordinate value ry associated with the camera 300 and the base 210 in the initial transformation matrix $C_{i-6}$. When i=12, $P_{BC}$(i) may represent the relative angle coordinate value rz associated with the camera 300 and the base 210 in the initial transformation matrix $C_{i-6}$.

$$P_{BC}(i,j) = P_{BC}(i) \pm \alpha(j) \cdot \Delta(i) \tag{4}$$

It is worth noting that the scale Δ(i) may include scales in different units. Specifically, the scale Δ(i) may include the scale corresponding to the position of the robot arm 200 (i.e., the scale associated with the coordinate values x, y, and z) and the scale corresponding to the posture of the robot arm 200 (i.e., the scale associated with the coordinate values rx, ry, and rz). Take equation (4) as an example, when it is assumed that i=7, the offset coordinate value $P_{BC}$(i) is associated with the relative offset coordinate value x of the camera 300 relative to the base 210. Accordingly, the unit of the scale) may be an offset amount. When it is assumed that i=10, the offset coordinate value $P_{BC}$(i) is associated with the relative angle coordinate value rx of the camera 300 relative to the base 210. Accordingly, the unit of the scale Δ(i) may be an angle.

In step S503, the processor 110 may select a selected offset coordinate value P which satisfies an equation (5) from the M offset coordinate values $P_{BC}$(i, j) (i=1-M) (i.e., select the selected offset coordinate value P corresponding to the minimum error e), and the initial transformation matrix $B_i$ (when i≤6) or the initial transformation matrix $C_{i-6}$ (when i>6) may be updated according to the selected offset coordinate value P. When i≤6, $B_i(P_{BC}(i,j))$ may be the initial transformation matrix $B_i$ where the i-th coordinate value is replaced by $P_{BC}$(i,j). Dis(A(k)·$B_i$($P_{BC}$ j)), $C_{i-6}$ D(k)) may be a distance between A(k)·$B_i$($P_{BC}$(i,j)) and $C_{i-6}$·D(k) (e.g., Manhattan distance or Euclidean distance). For instance, if the selected offset coordinate value P is the coordinate value $P_{BC}$(1,1), the processor 110 may replace the relative offset coordinate value x of the terminal 220 relative to the tool set 230 in the initial transformation matrix $B_i$ with the coordinate value $P_{BC}$(1,1) and may further update the initial transformation matrix $B_i$. When the transformation matrix A(k), the initial transformation matrix $B_i(P_{BC}(i,j))$, the initial transformation matrix $C_{i-6}$, and the transformation matrix D(k) are substituted into the identity equation (2), the selected offset coordinate value P may minimize the error between the left-hand side and the right-hand side of the identity equation (2).

$$\begin{cases} P = \underset{P_{BC}(i,j)}{\operatorname{argmin}} \sum_{k=1}^{N} Dis(A(k) \cdot B_i(P_{BC}(i,j)),\ C_{i-6} \cdot D(k)),\ i \le 6 \\ P = \underset{P_{BC}(i,j)}{\operatorname{argmin}} \sum_{k=1}^{N} Dis(A(k) \cdot B_i,\ C_{i-6}(P_{BC}(i,j)) \cdot D(k)),\ i > 6 \end{cases} \tag{5}$$

Similarly, when i>6 (i.e., after the initial transformation matrix $B_i$ is updated), the processor 110 may select a selected offset coordinate value P that satisfies the equation (5) from M offset coordinate values $P_{BC}$(i, j) (j=1-M) and may, based on the selected offset coordinate value P, update the initial transformation matrix $C_{i-6}$, where $C_{i-6}(P_{BC}(i,j))$ may be the initial transformation matrix $C_{i-6}$ where the (i-6)th coordinate value is replaced by $P_{BC}$(i,j) Dis(A(k)·$B_i$, $C_{i-6}(P_{BC}(i,j))$·D(k)) may be the distance between A(k)·$B_i$ and $C_{i-6}(P_{BC}(i,j))$ D(k). For instance, if the selected offset coordinate value P is a coordinate value $P_{BC}$(7,1), the processor 110 may replace the relative offset coordinate value x associated with the camera 300 and the base 210 in the initial transformation matrix $C_{i-6}$ with the coordinate value $P_{BC}$(7, 1) and then update the initial transformation matrix $C_{i-6}$. When the transformation matrix A(k), the initial transformation matrix $B_i$, the initial transformation matrix $C_{i-6}(P_{BC}$ (i,j)), and the transformation matrix D(k) are substituted into the identity equation (2), the selected offset coordinate value P may minimize the error between the left-hand side and the right-hand side of the identity equation (2).

In step S504, the processor 110 may determine whether the value of i is equal to 12. If the value of i is less than 12, step S505 is performed, where the processor 110 may add 1 to the value of i. If the value of i is equal to 12, step S506 is performed.

In step S506, the processor 110 may complete the update of the initial transformation matrices $B_i$ and $C_{i-6}$. If the processor 110 is performing the step S402, the processor 110 may generate the transformation matrix B' and the transformation matrix C' in the step S506. If the processor 110 is performing the step S403, the processor 110 may generate the transformation matrix B" and the transformation matrix C" in the step S506. If the processor 110 is performing the step S409, the processor 110 may generate a transformation matrix B'" and a transformation matrix C'" in the step S506.

As shown in FIG. 4, in step S403, the processor 110 may update the transformation matrix B' according to the scale Δ(i) to obtain the transformation matrix B" and update the transformation matrix C' according to the scale Δ(i) to obtain the transformation matrix C". The processor 110 may update the transformation matrix B' and the transformation matrix C' according to the steps shown in FIG. 4, which will not be further explained hereinafter. In this embodiment, the steps S402 and S403 are performed for repetitive verification, so as to prevent the error e generated in another dimension (e.g., x, y, z, rx, ry, or rz) from being affected by updating one dimension.

In step S404, the processor 110 may calculate an error E' corresponding to the transformation matrix B' and the transformation matrix C' according to an equation (6) and may calculate an error E" corresponding to the transformation matrix B" and the transformation matrix C" according to an equation (7). Next, the processor 110 may determine whether an absolute difference between the error E' and the error E" is less than or equal to a difference threshold T1; that is, the processor 110 may determine whether |E"−E'|≤T1 is correct. If the absolute difference between the error E' and the error E" is less than or equal to the difference threshold T1 (representing the error e is converged), the step S406 is performed. If the absolute difference between the error E' and error E" is greater than the difference threshold T1 (representing that error e is not converged), step S405 is performed.

$$E' = \sum_{k=1}^{N} Dis(A(k) \cdot B', C' \cdot D(k)) \tag{6}$$

$$E'' = \sum_{k=1}^{N} Dis(A(k) \cdot B'', C'' \cdot D(k)) \tag{7}$$

In the step S405, the processor 110 may set the initial transformation matrix B applied in the step S402 as the current transformation matrix B' and may set the initial transformation matrix C applied in the step S402 as the current transformation matrix C'. After the step S405 is completed, the processor 110 may re-perform the step S402 to obtain the updated transformation matrix B' and the updated transformation matrix C'.

In the step S406, the processor 110 may determine whether the current scale Δ(i) is less than or equal to a scale threshold T2; that is, the processor 110 may determine whether Δ(i)≤T2 is correct. If the scale Δ(i) is less than or equal to the scale threshold T2, it represents that the calibration of the transformation matrix B and the transformation matrix C by the processor 110 is already accurate. Accordingly, the processor 110 may perform the step S409. On the other hand, if the scale Δ(i) is greater than or equal to the scale threshold T2, step S407 is performed.

In the step S407, the processor 110 may reduce the scale Δ(i). After the scale Δ(i) is reduced, the processor 110 may proceed to perform the step S405.

In the step 406, if the determine result is yes, it represents that the currently used scale is sufficient to accurately calibrate the transformation matrix B and the transformation matrix C. However, even if the accuracy of the calibration result reaches a high level, the calibration result may still be a local optimal solution instead of a global optimal solution. In order to solve said issue, in step S408, the processor 110 may be Δ(i). Next, in the step S409, the processor 110 may obtain the transformation matrix B'" by updating the transformation matrix B" according to the scale Δ(i) and may obtain the transformation matrix C'" by updating the transformation matrix C" according to the scale Δ(i). The processor 110 may update the transformation matrix B" and the transformation matrix C" according to the steps shown in FIG. 4, which will not be further explained hereinafter.

The processor 110 may determine whether the error e is increased by updating the transformation matrix B and the transformation matrix C according to the increased scale Δ(i). If yes, step S411 is performed. If not, the step S405 is performed. In detail, in step S410, the processor 110 may calculate an error E'" corresponding to the transformation matrix B'" and the transformation matrix C'" according to an equation (8). Next, the processor 110 may determine whether the error E'" is less than the error E"; that is, processor 110 may determine whether E'"<E" is correct. If the error E'" is less than the error E", it represents that after the scale Δ(i) is increased, the error of the identity equation (2) is reduced. That is, the transformation matrix B' and the transformation matrix C' obtained in the step S402 (or the transformation matrix B" and transformation matrix C" obtained in step S303) are the local optimal solutions rather than the global optimal solutions. Accordingly, the processor 110 may perform the step S405 and then update the transformation matrix B' and the transformation matrix C' according to the current scale Δ(i), so as to minimize the error e. On the other hand, if the error E'" is greater than or equal to the error E", it represents the transformation matrix B' and the transformation matrix C' obtained in the step S402 (or the transformation matrix B" and the transformation matrix C" obtained in the step S303) are the global optimal solutions. Accordingly, the processor 110 may perform the step S411.

As shown in FIG. 3, in the step 303, in response to the error e being converged and the scale Δ(i) being less than or equal to the scale threshold T2, the processor 110 may output the mapping relationship between the terminal 220 and the tool set 230 and the mapping relationship between the base 210 and the camera 300 calibrated by the scale Δ(i). Specifically, with reference to FIG. 4, in the step S411, the processor 110 may generate the calibrated transformation matrix B according to the transformation matrix B' (or the transformation matrix B") and generate the calibrated transformation matrix C according to the transformation matrix C' (or the transformation matrix C"). Thereafter, the processor 110 may output the calibrated transformation matrix B and the calibrated transformation matrix C through the transceiver 130.

In an embodiment, the processor 110 may select one of the transformation matrix B' and the transformation matrix B" as the calibrated transformation matrix B. In addition, the processor 110 may select one of the transformation matrix C' and the transformation matrix C" as the calibrated transformation matrix C.

To sum up, as to the coordinate transformation relationship among each element in the robot arm system, the hand-eye calibration device provided in one or more embodiments of this disclosure may calibrate the transformation matrix that may have errors in the coordinate transformation relationship by applying a specific scale. After completing the calibration of the transformation matrix, the hand-eye calibration device may reduce the scale and calibrate the transformation matrix again. As such, the hand-eye calibration device is able to continuously calibrate the transformation matrix by applying a reduced scale, so as to ensure the accuracy of the transformation matrix. In addition, after completing the calibration of the transformation matrix, the hand-eye calibration device may increase the scale to update the transformation matrix, so as to determine whether the calibrated transformation matrix satisfies the global optimal solution. Therefore, the hand-eye calibration device may prevent the calibration result of the robot arm from falling into the local optimal solution. In addition, the correction process sequentially corrects each dimension, that is, uses convergence along one axis, which can greatly reduce the computational complexity.

It will be apparent to those skilled in the art that various modifications and variations may be made to the disclosed embodiments without departing from the scope or spirit of the disclosure. In view of the foregoing, it is intended that the disclosure covers modifications and variations provided they fall within the scope of the following claims and their equivalents.

What is claimed is:

1. A hand-eye calibration method, adapted to a robot arm, comprising:

obtaining a first mapping relationship between a base of the robot arm and a terminal of the robot arm and a second mapping relationship between a camera and a target object, wherein the camera is installed at a fixed position to capture a fixed monitored region, and the target object is placed in the fixed monitored region;

sequentially updating a third mapping relationship between the terminal of the robot arm and a tool set mounted on the terminal and a fourth mapping relationship between the camera and the base in each dimension based on a scale, to minimize an error between a position of the target object in an image captured by the camera and a position of the tool set; and in response to the error being convergent and the scale less than or equal to a scale threshold, outputting the third mapping relationship and the fourth mapping relationship calibrated by the scale.

2. The hand-eye calibration method according to claim 1, further comprising:

in response to the error being convergent and the scale greater than the scale threshold, reducing the scale to update the third mapping relationship and the fourth mapping relationship.

3. The hand-eye calibration method according to claim 1, wherein the step of sequentially updating the third mapping relationship and the fourth mapping relationship in each dimension based on the scale comprises:

obtaining a coordinate value corresponding to the third mapping relationship, and generating a plurality of offset coordinate values according to the scale and the coordinate value;

selecting a selected offset coordinate value corresponding to the error having a minimum value from the plurality of offset coordinate values according to the first mapping relationship and the second mapping relationship; and updating the third mapping relationship according to the selected offset coordinate value.

4. The hand-eye calibration method according to claim 1, wherein in response to the error being convergent and the scale less than or equal to the scale threshold, the step of outputting the third mapping relationship and the fourth mapping relationship calibrated by the scale comprises:

increasing the scale, and determining whether the error is increased by updating the third mapping relationship and the fourth mapping relationship according to the increased scale;

when yes, outputting the third mapping relationship and the fourth mapping relationship calibrated by the scale; and when not, updating the third mapping relationship and the fourth mapping relationship according to the increased scaled, to minimize the error.

5. The hand-eye calibration method according to claim 1, further comprising:

updating the third mapping relationship based on the scale to generate a first transformation matrix and updating the fourth mapping relationship based on the scale to generate a second transformation matrix;

calculating a first error between the third and fourth mapping relationships and the first and second transformation matrices;

updating the first transformation matrix based on the scale to generate a third transformation matrix and updating the second transformation matrix based on the scale to generate a fourth transformation matrix;

calculating a second error between the first and second transformation matrices and the third and fourth transformation matrices; and in response to an absolute difference which is between the first error and the second error and less than or equal to a difference threshold, determining the error as being convergent.

6. The hand-eye calibration method according to claim 1, wherein each dimension comprises an x-axis, a y-axis, a z-axis, an angle of torsion along the x-axis, an angle of torsion along the y-axis, and an angle of torsion along the z-axis.

7. The hand-eye calibration method according to claim 1, wherein the first mapping relationship comprises a coordinate transformation relationship between the base and the terminal, the second mapping relationship comprises a coordinate transformation relationship between the camera and the target object, the third mapping relationship comprises a coordinate transformation relationship between the terminal and the tool set, and the fourth mapping relationship comprises a coordinate transformation relationship between the camera and the base.

8. A hand-eye calibration device, adapted to a robot arm and comprising:

a transceiver; and a processor, coupled to the transceiver and configured to:

obtain a first mapping relationship between a base of the robot arm and a terminal of the robot arm and a second mapping relationship between a camera and a target object through the transceiver, wherein the camera is installed at a fixed position to capture a fixed monitored region, and the target object is placed in the fixed monitored region;

sequentially update a third mapping relationship between the terminal of the robot arm and a tool set mounted on the terminal and a fourth mapping relationship between the camera and the base in each dimension based on a scale, to minimize an error between a position of the target object in an image captured by the camera and a position of the tool set; and in response to the error being convergent and the scale less than or equal to a scale threshold, output the third mapping relationship and the fourth mapping relationship calibrated by the scale through the transceiver.

9. The hand-eye calibration device according to claim 8, wherein the processor is further configured to:

in response to the error being convergent and the scale greater than the scale threshold, reduce the scale to update the third mapping relationship and the fourth mapping relationship.

10. The hand-eye calibration device according to claim 8, wherein the processor is further configured to:

obtain a coordinate value corresponding to the third mapping relationship, and generating a plurality of offset coordinate values according to the scale and the coordinate value;

select a selected offset coordinate value corresponding to the error having a minimum value from the plurality of offset coordinate values according to the first mapping relationship and the second mapping relationship; and update the third mapping relationship according to the selected offset coordinate value.

11. The hand-eye calibration device according to claim 8, wherein the processor is further configured to:

increase the scale, and determining whether the error is increased by updating the third mapping relationship and the fourth mapping relationship according to the increased scale;

when yes, output the third mapping relationship and the fourth mapping relationship calibrated by the scale; and when not, update the third mapping relationship and the fourth mapping relationship according to the increased scaled, so as to minimize the error.

12. The hand-eye calibration device according to claim 8, wherein the processor is further configured to:

update the third mapping relationship based on the scale to generate a first transformation matrix and update the fourth mapping relationship based on the scale to generate a second transformation matrix;

calculate a first error between the third and fourth mapping relationships and the first and second transformation matrices;

update the first transformation matrix based on the scale to generate a third transformation matrix and update the second transformation matrix based on the scale to generate a fourth transformation matrix;

calculate a second error between the first and second transformation matrices and the third and fourth transformation matrices; and in response to an absolute difference which is between the first error and the second error and less than or equal to a difference threshold, determine the error as being convergent.

13. The hand-eye calibration device according to claim 8, wherein each dimension comprises an x-axis, a y-axis, a z-axis, an angle of torsion along the x-axis, an angle of torsion along the y-axis, and an angle of torsion along the z-axis.

14. The hand-eye calibration device according to claim 8, wherein the first mapping relationship comprises a coordinate transformation relationship between the base and the terminal, the second mapping relationship comprises a coordinate transformation relationship between the camera and the target object, the third mapping relationship comprises a coordinate transformation relationship between the terminal and the tool set, and the fourth mapping relationship comprises a coordinate transformation relationship between the camera and the base.

* * * * *